United States Patent
Giefer et al.

(10) Patent No.: US 7,726,215 B2
(45) Date of Patent: *Jun. 1, 2010

(54) MOVEMENT CONVERTER FOR AN ISODISTANT SHIFTING SENSOR SYSTEM

(75) Inventors: Andreas Giefer, Lemförde (DE); Jörg Meyer, Wagenfeld (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/923,941

(22) Filed: Oct. 25, 2007

(65) Prior Publication Data
US 2008/0041182 A1 Feb. 21, 2008

Related U.S. Application Data

(62) Division of application No. 10/939,932, filed as application No. PCT/DE03/02282 on Jul. 8, 2003, now Pat. No. 7,430,938.

(30) Foreign Application Priority Data
Jul. 9, 2002 (DE) ................................ 102 31 015

(51) Int. Cl.
*F16H 59/04* (2006.01)
*G05G 9/047* (2006.01)

(52) U.S. Cl. .................................. 74/473.12; 74/473.33
(58) Field of Classification Search ............. 74/473.12, 74/473.18, 473.33
See application file for complete search history.

(56) References Cited

U.S. PATENT DOCUMENTS 6,415,677 B1 * 7/2002 Skogward ................ 74/473.12

* cited by examiner

*Primary Examiner*—William C Joyce
(74) *Attorney, Agent, or Firm*—McGlew and Tuttle, P.C.

(57) ABSTRACT

A device is provided for transmitting a biaxial pivoting movement of a gearshift lever (2) into a planar movement of a gearshift lever position transmitter with a guide element (20, 27, 31, 32) for limiting the movement of the gearshift lever position transmitter to a movement in a noncurved plane. The device includes a transmission element (19, 7a) for transmitting a pivoting movement of the gearshift lever (2) about a first pivot axis (11) into a pivoting movement of the gearshift lever position transmitter in a noncurved plane, and with a hinge joint for converting a pivoting movement of the gearshift lever (2) about a second pivot axis (12) into a linear movement of the gearshift lever position transmitter in the noncurved plane. The positions (15a) of the gearshift lever (2) can be detected in the noncurved plane.

6 Claims, 5 Drawing Sheets

MOVEMENT CONVERTER FOR AN ISODISTANT SHIFTING SENSOR SYSTEM

CROSS REFERENCE TO RELATED APPLICATION

This application is a divisional application under 37 CFR 1.53(b) of prior application Ser. No. 10/939,932 filed Sep. 13, 2004 now U.S. Pat. No. 7,430,938 and claims the benefit (35 U.S.C. §120 and 365(c)) of International Application PCT/DE 2003/002282 of Jul. 8, 2003, which designated inter alia the United States and which claims the priority of German Patent Application DE 102 31 015.7 of Jul. 9, 2002. The entire contents of each application is hereby incorporated by reference in its entirety.

FIELD OF THE INVENTION

The present invention pertains to a system for the electromechanical actuation of a transmission, especially to a system for detecting gearshift lever positions.

BACKGROUND OF THE INVENTION

Electromechanical shifting systems are used to transmit the adjusting movement of a gearshift lever to a corresponding shift position of a transmission. Instead of the classical transmission of the gearshift lever position via cables and gear shift linkages to the transmission, a sensor system is used, which detects the particular current position of the gearshift lever from the cooperation of actuators and sensors. The identity of the gearshift lever position detected is transmitted to a control unit of the transmission with electric, electronic, electro-optic or other similar means and converted by the control unit into a corresponding shifting state of the transmission. Such shifting systems are currently known under the name shift-by-wire. They are used preferably in automated manual transmissions or automatic transmissions. Automated manual transmissions can be manufactured at a lower cost and as lighter and more compact units compared with automatic transmissions. As a result and especially in connection with the high efficiency due to the system, great significance is attached to the automated manual transmission in the future development of motor vehicles.

The position of the gearshift lever is frequently detected in electromechanical shifting systems with magnetically or optically acting sensors, e.g., Hall sensors, optoreflex sensors or the like. During the movement of the gearshift lever, distinction is made between two movement spaces, which correspond to the pivoting directions of the gearshift lever about two pivot axes. The "selection" movement space preferably comprises a change in the gearshift lever position in a first direction, and the "shifting" movement space a change in the gearshift lever position at right angles to this direction. In case of orthogonal movement spaces, the two pivot axes are also arranged at right angles to one another, and the first direction may correspond, e.g., to the direction of the vehicle. However, it is also possible for the first direction to extend at right angles to the direction of the vehicle. The position of a gearshift lever is correspondingly detected separately for the two movement spaces. The shifting of the transmission selected with a certain position of the gearshift lever is obtained from the combination of the projections of this position to the "selection" and "shifting" movement spaces.

To keep the manufacturing effort needed for an electromechanical gearshift lever module low, the sensors for the "selection" and "shifting" movement spaces are accommodated on a single planar, i.e., flat and noncurved printed circuit board. The actuator is mechanically connected with the gearshift lever and is arranged opposite the printed circuit board with the sensors. Since a change in the gearshift lever position takes place due to the pivoting of the gearshift lever, the clearance between the actuator and a sensor changes with the shift position of the gearshift lever in this design.

The range of action of the actuators is, in general, limited very narrowly, so that the sensors are responded to differently. If, for example, a magnetic sensor system with a permanent magnet as the actuator is used, the activating magnetic field has a gaussian distribution of the magnetic field contour. The width and the intensity of the distribution change with the distance from the magnet. The switch-on and switch-off thresholds of the magnetic field-sensitive sensors, for example, Hall sensors, are therefore different for each shift position.

To counteract this effect, a printed circuit board may be curved such that the distances between the actuator and the respective sensors are kept constant in the different shifting states. However, the manufacture of a correspondingly curved printed circuit board is associated with great effort and therefore high manufacturing costs. As an alternative, a sensor may be designed individually for each shift position. However, this solution also leads to considerable extra costs in manufacture.

A flat sensor system can be embodied by means of a slide system carried by the gearshift lever. This solution is very complicated in terms of design and has the drawback that the tolerance chain in the detection of the gearshift lever position is made longer, besides the extra costs caused by this solution in the manufacture.

A technically good solution is offered by the arrangement of two planar printed circuit boards at right angles to one another. Each of the noncurved printed circuit boards carries here a flat sensor system for only one of the "selection" and "shifting" movement spaces, so that the distances between the actuators and the respective sensors do not change for the different positions of the gearshift lever. Since each shift position is composed of a "selection" position combined with a "shifting" position, considerably more sensors are also necessary between two actuators in this solution than in a solution corresponding to the above-mentioned solution designs. Furthermore, the terminals of the two boards must be combined, so that the embodiment of this solution is extremely complicated and cost-intensive.

SUMMARY OF THE INVENTION

The basic object of the present invention is therefore to provide a simple mechanism, which makes possible the detection of the "selection" and "shifting" movement spaces by means of a planar array of sensors of a uniform characteristic with a minimum of tolerances.

The object is accomplished, in particular, by a device for converting a biaxial pivoting movement of a gearshift lever into a planar movement of a gearshift lever position transmitter with a guide element to limit the movement of the gearshift lever position transmitter to a movement in a noncurved plane, with a transmission element for transmitting a pivoting movement of the gearshift lever about a first pivot axis into a pivoting movement of the gearshift lever position transmitter in the noncurved plane, and a hinge joint for converting a pivoting movement of the gearshift lever about a second pivot axis into a linear movement of the gearshift lever position transmitter in the noncurved plane, so that the gearshift lever positions of the gearshift lever can be detected in the noncurved plane.

The above object is accomplished by an electromechanical gearshift lever system with a biaxially mounted gearshift lever, a device according to the present invention for concerting a biaxial pivoting movement of a gearshift lever into a planar movement of a gearshift lever position transmitter, and sensors, which are arranged in parallel to the noncurved plane opposite the gearshift lever position transmitter for detecting certain gearshift lever positions.

The device according to the present invention permits the use of a standard planar sensor system in an electromechanical gearshift lever system with a low design effort.

The hinge joint is advantageously arranged to the side of the gearshift lever for the compact design of the electromechanical gearshift lever system.

To transmit the pivoting movements of the gearshift lever to the gearshift lever position transmitter, the first pivot axis of the gearshift lever is expediently made in the form of a bearing bolt with an end designed as a joint head for being accommodated in the gearshift lever position transmitter. To accommodate the joint head, the gearshift lever position transmitter advantageously has an elongated opening with a cross section geometry that essentially reflects the geometry of the joint head at right angles to the axis of the bearing bolt with equal or larger dimensions, so that the joint head can slide along the opening without transmission of force, but reliable transmission of forces is guaranteed in at least one direction at right angles hereto.

For the exclusive transmission of the pivoting movement of the first pivot axis of the gearshift lever to the gearshift lever position transmitter, the joint head is preferably of a spherical shape. If rotation of the first pivot axis is also to be transmitted to the gearshift lever position transmitter, the joint head preferably has a cylindrical geometry, and the axis of symmetry of the cylindrical joint head is arranged essentially at right angles to the first pivot axis or the axis of the bearing bolt. The joint head may advantageously form the transmission element.

In a preferred embodiment, the transmission element extends around the gearshift lever at a spaced location from the first pivot axis of the gearshift lever. It expediently has a strap-shaped element for this purpose, which extends around the gearshift lever. To reliably transmit the desired pivoting movement and to exclude the other pivoting movement, the strap-shaped element extends around the gearshift lever such that the gearshift lever carries the transmission element during pivoting about its first pivot axis and moves freely in the strap-shaped element during pivoting about its second pivot axis.

Reliable detection of the gearshift lever positions is achieved by arranging the guide element with a defined reference to the gearshift lever housing.

The transmission element may be mounted pivotably about a pivot pin, so that a pivoting movement of the gearshift lever about the first pivot axis is converted into a pivoting movement of the transmission element in a simple manner. The geometric position of the axis of the pivot pin may be arranged now within the alignments that can be assumed by the first pivot axis of the gearshift lever in order for a pivoting movement of the bearing journal to be able to be reliably transmitted to the gearshift lever position transmitter without special precautions.

Corresponding to an advantageous variant, the pivot pin may be designed to limit a movement of the transmission element to the noncurved plane and thus be part of the guide element. If necessary, a guide element may also be provided at the transmission element. The guide element may preferably be formed by an opening in the transmission element, in which case the gearshift lever position transmitter is displaceable radially to the pivot axis of the transmission element.

In a preferred embodiment, the gearshift lever position transmitter has an actuator in the form of a permanent magnet. The sensors are preferably designed as Hall sensors.

A device according to the present invention and an electromechanical gearshift lever system according to the present invention may be used, for example, in motor vehicles such as passenger cars or utility vehicles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, functionally equivalent elements are designated by the same reference numbers in the figures.

Figure 1:
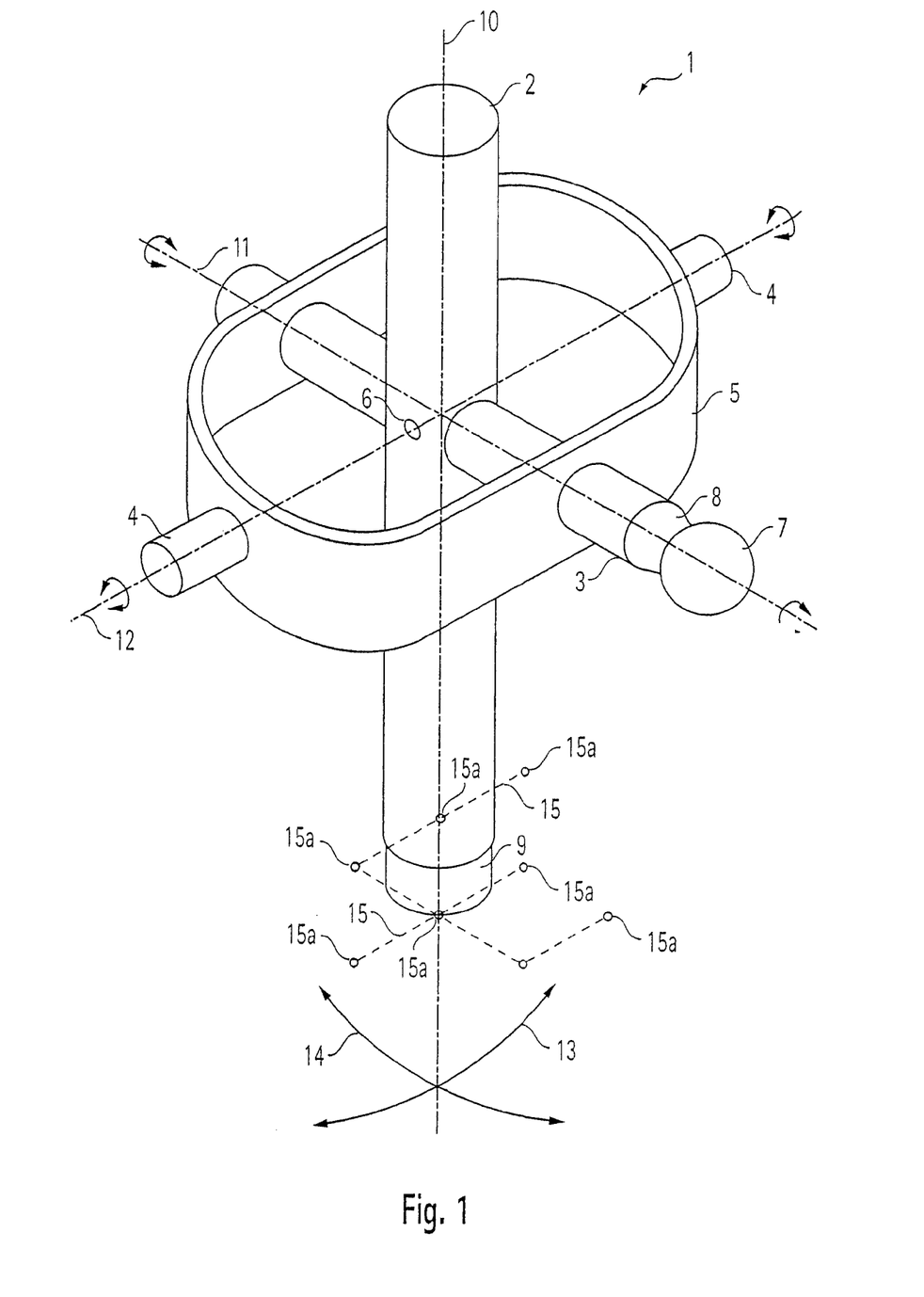
FIG. 1 is a perspective view showing a gearshift lever mechanism for the use of a movement converter according to the present invention.

The general design of a gearshift lever mechanism 1, as it is used to build an electromechanical shifting system in motor vehicles, is shown in FIG. 1. The gearshift lever 2, whose upper end, which terminates mostly in a vehicle shift knob, is not shown in FIG. 1, has a locking element 9 at its lower end, which said locking element 9 is displaceable along the axis 10 of the gearshift lever and whose surface is designed such that it makes possible a locking displacement in a locking contour. The displacement of the locking element 9 in the locking contour is brought about by pivoting the gearshift lever 2 about two pivot axes 11 and 12, which are usually arranged at right angles to one another. The locking contour limits the movement of the gearshift lever, so that the locking element can be displaced only along predetermined paths. The broken lines 15 represent an example of such a course of the path. The circles 15a on the broken lines 15 indicate the position of the exemplary locking positions of the locking contour.

The first pivot axis 11 of the gearshift lever 2 is formed by a bearing bolt 3, whose axis of symmetry is preferably led through the gearshift lever 2 at right angles to the longitudinal axis 10 of the gearshift lever. The bearing bolt 3 may be accommodated, for example, in a through hole of the gearshift lever 2, but it may also be arranged, having a two-part design, at opposite points of the gearshift lever. The cross section of the bearing bolt 3 may be provided, at least in the area in which it is held by the gearshift lever, with a noncircular profile for connection secured against rotation. However, the safety against rotation of the bearing bolt may also be achieved by means of a securing pin 6, as is shown in FIG. 1, or by a one-piece design of the gearshift lever and the bearing bolt.

The gearshift lever 2 is mounted either at the bearing bolt 3 or it is mounted rotatably in a bracket 5, so that the gearshift lever 2 can be pivoted about the pivot axis 11 of the bearing bolt 3. Two additional bolts 4, whose axes of symmetry form a second pivot axis 12 for the gearshift lever, are arranged at two opposite points of the bracket 5. The second pivot axis 12 is preferably arranged at right angles to the first pivot axis 11. The cross section profile of the bolts 4 is not necessarily circular. However, it is suitably accommodated in a bearing shell, e.g., of a gearshift lever housing or of a support, and a pivoting movement is made possible in the necessary angle range about the pivot axis 12.

During their cooperation, the two pivot axes 11 and 12 form a universal joint of a kind of cardanic mount. The movement of the locking element 9 is therefore limited to a movement in a curved surface, as it is indicated by the arrows 13 and 14 in FIG. 1. If an actuator is arranged at the locking element 9 or a component rigidly connected with the gearshift lever 2, the actuator likewise moves in a twice-curved plane during the pivoting of the gearshift lever 2. In this case, the sensors of a shifting sensor system must either be arranged likewise in a correspondingly curved plane, or their response characteristic must be individually adapted to the different distances from the actuator in case of planar arrangement.

In order to guide the actuator in a planar, i.e., noncurved plane according to the present invention during the pivoting of the gearshift lever 2, the actuator is movably connected with the gearshift lever 2. Two mutually independent pivoting movements, namely, about the first pivot axis 11 and the second pivot axis 12, are now to be converted into two mutually independent movements of the actuator in a planar plane.

During the pivoting of the gearshift lever 2 about the first pivoting axis 11, the gearshift lever describes an arc in the plane defined by the second pivot axis 12 and the gearshift lever axis 10. If the bearing bolt 3 is connected with the gearshift lever 2 such that it is secured against rotation, this pivoting movement also leads to rotation of the bearing bolt about its axis 11. Pivoting of the gearshift lever 2 about the second pivot axis 12 leads, by contrast, to a deflection or pivoting of the bearing bolt 3 about this second pivot axis 12.

Depending on the type of the connection between the bearing bolt 3 and the gearshift lever 2, one or both pivoting movements can therefore be obtained from the bearing bolt 3. To convert the pivoting of the bearing bolt 3 into a linear displacing movement of a deflected joint body 16, one end of the bearing bolt 3 is designed as a joint head 7 or 7a. The joint head 7 has a preferably circular profile in the plane defined by the gearshift lever axis 10 and the first pivot axis 11. As is shown in the longitudinal section in FIG. 2, a mounting opening 17 of the joint body 16, which is shaped as an elongated opening in a joint body 16, can thus be pushed over the joint head and tilted against the pivot axis 11.

Figure 2:
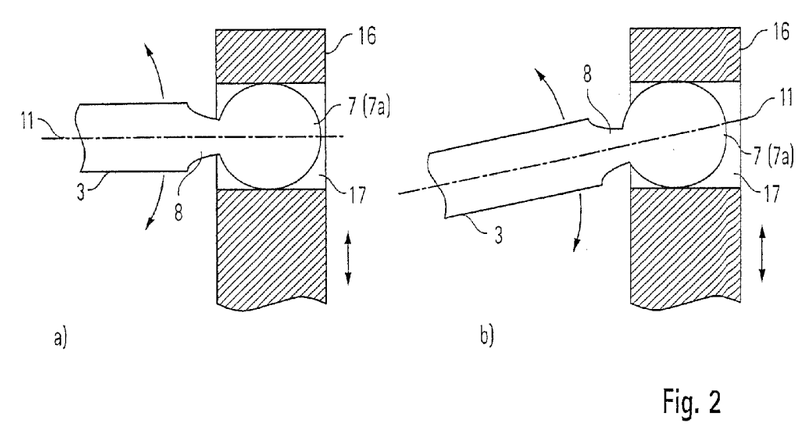
FIG. 2 is a longitudinal sectional view through a hinge joint according to the present invention between the first pivot axis of a gearshift lever and the joint body.

The joint body has a mounting bracket 22 for arranging an actuator. Together with the actuator, the joint body forms a gearshift lever position transmitter.

A guide, not shown in FIG. 2, holds the joint body 16 in a plane of displacement defined in space. Depending on the design requirement, this plane of displacement may be directed in parallel or at a defined angle to the gearshift lever axis 10 in the neutral or normal position of the gearshift lever 2.

During the pivoting of the gearshift lever 2 about the second pivot axis 12, the joint head 7 or 7a moves on an arc of a circle with its center in the intersection of the gearshift lever axis 10 and the second pivot axis 12. Therefore, not only will the angle between the bearing bolt axis 11 and the plane of displacement of the joint body 16 change, but the joint head will also slip deeper into the elongated bearing opening 17 or back out of same depending on the direction of pivoting. The views a) and b) in FIG. 2 illustrate this process. To prevent the bearing bolt 3 with the joint body 16 from tilting, the diameter of the joint head 7 or 7a may be selected to be correspondingly large or, as can be seen in FIGS. 1 and 2, a tapered neck 8 may be formed at the attachment of the joint head.

However, in the form of a through hole, the bearing opening 17 may also be designed as a blind hole at the pushing element 16. If a pivoting movement of the bearing bolt 3 at right angles to the longitudinal direction 18 of the joint body 16 does not have to be divided into a movement component directed along the longitudinal direction 18 and a movement component directed at right angles thereto, the cross section of the bearing opening corresponds essentially to the circumferential geometry of the joint head 7 or 7a, as it appears from the view in the direction of the first pivot axis 11. The cross section geometry of the bearing opening otherwise corresponds to a circumference geometry of the joint head stretched at right angles to the longitudinal direction 18. The joint head can thus move freely within certain limits in the bearing opening at right angles to the longitudinal direction 18 of the joint body 16. Forces are thus transmitted only in the longitudinal direction of the joint body 16. The broadening of the bearing opening compared with the geometry of the joint head is obtained from the maximum pivoting angles about the first and second pivot axes. It is negligible in the case of small pivoting angles.

Only the pivoting movement of the bearing bolt 3 is transmitted to the joint body 16 via the joint head 7 in a first embodiment of the present invention. A possible rotation of the bearing bolt 3 is left unused. The joint head 7 therefore preferably has a spherical shape in this case.

In a second embodiment of the present invention, the rotary movement of the bearing bolt 3 is additionally converted into a rotation of the joint body 16 about the first pivot axis 11. The geometry of the circumference of the joint head 7a at right angles to the first pivot axis 11 deviates markedly in this case from the geometry of a circle. The joint head geometries used are preferably rotationally symmetrical bodies deviating from the spherical shape, wherein the rotation axis of symmetry extends at right angles to the pivot axis 11. For example, polygons with even numbers of sides, ellipses or the like may be used as circumference geometries.

Figure 3:
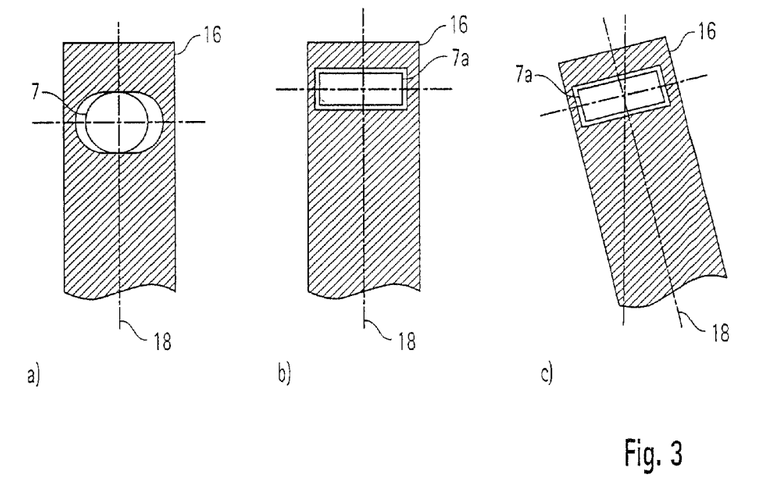
FIG. 3 is a cross sectional view of a hinge joint according to the present invention according to a first embodiment (a) and a second embodiment at a first pivot angle (b) and at a second pivot angle (c) of the first pivot axis of the gearshift lever mechanism.

The operating principle of the torque transmission is illustrated in the views in FIG. 3. In case of a spherical design of the joint head 7, a rotation of the bearing bolt 3 about its axis 11 is not transmitted to the joint body 16, so that the longitudinal direction 18 of the joint body 16 maintains its position unchanged (FIG. 3a). If a nonspherical, rotationally symmetrical joint head 7a, such as the cylindrical joint head according to FIGS. 3b and 3c, is used, the rotary movement of the bearing bolt is converted, in contrast, into a corresponding deflection of the joint body 16. The deflection of the longitudinal direction 18 from the start position corresponds to the angle of rotation of the bearing bolt 3.

Figure 4:
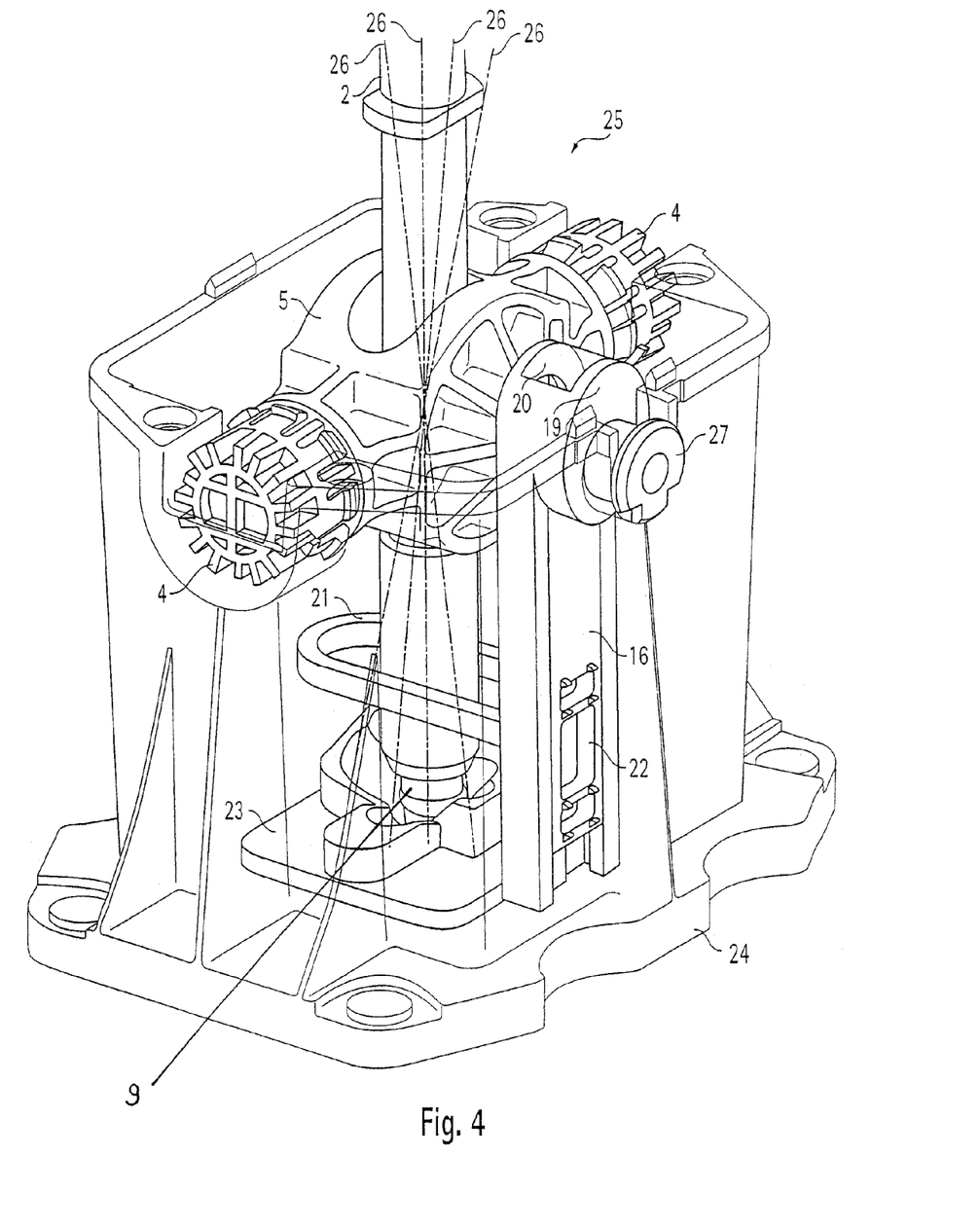
FIG. 4 is a view showing an electromechanical gearshift lever assembly unit with a first embodiment of a movement converter according to the present invention.

FIG. 4 shows a view of a gearshift lever assembly unit 25 with a movement converter according to a first embodiment of the present invention. The core of the assembly unit 25 is a gearshift lever 2, which is mounted in a universal joint as described in reference to FIG. 1. The locking element 9 at the lower end of the gearshift lever engages a locking contour 23, so that the gearshift lever 2 can be moved only between defined positions 26. A gearshift lever housing 24 accommodates the gearshift lever mechanism. Bearing shells, in which the bolts 4 of the universal joint are mounted rotatably, are formed on the housing 24. The locking contour 23, the device according to the present invention for converting the movement of the gearshift lever, as well as the sensor system, not shown in the figure, are located in the gearshift lever housing 24.

The joint body 16 is arranged, as is shown in FIGS. 2 and 3a, at the joint head 7. It has an elongated shape, the longitudinal direction 18 being arranged radially to the first pivot axis of the gearshift lever. The joint body 16 is accommodated in an elongated opening 20 of a transmission element 19 extending around it. It can be displaced along the longitudinal direction of the opening 20. The transmission element 19 is mounted pivotably with a pivot pin 27 at a wall of the gearshift lever housing 24. The geometric position of the axis of the pivot pin 27 is arranged within the directions or positions that can be assumed by the first pivot axis 11. The mounting of the pivot pin 27 at, e.g., the gearshift lever housing 24 may be designed as a rigid or linearly displaceable mounting. In case of linear displaceability, the direction of displacement follows the pivoting movement of the bearing bolt 3.

An opening in the transmission element 19 opposite the pivot pin 27 permits the bearing bolt 3 with the joint head 7 to be passed through. The dimensions of the opening permit the unhindered pivoting of the bearing bolt 3 within the area predetermined by the locking contour. Pivoting of the bearing bolt 3 about the second pivot axis 12 is converted by this arrangement into a linear displacement of the joint body 16 along the longitudinal direction of the opening 20 in the transmission element 19. The longitudinal direction of the opening 20 coincides with the longitudinal direction 18 of the joint body 16.

A strap 21, which extends around the gearshift lever in its lower area, is arranged at the transmission element 19 at a spaced location from the axis of the pivot pin 27. As an alternative, the strap 21 may also extend around the gearshift lever in its upper area. The strap has an elongated eye, through which the gearshift lever 2 is passed. The width of the eye of the strap is directed in parallel to the second pivot axis 12 of the gearshift lever 2 and corresponds essentially to the diameter or the width of the gearshift lever. The length of the eye of the strap is directed in parallel to the first pivot axis 11 of the gearshift lever 2 and permits the unhindered pivoting of the gearshift lever 2 about the second pivot axis for all the positions 26 set by the locking contour 23.

Figure 5:
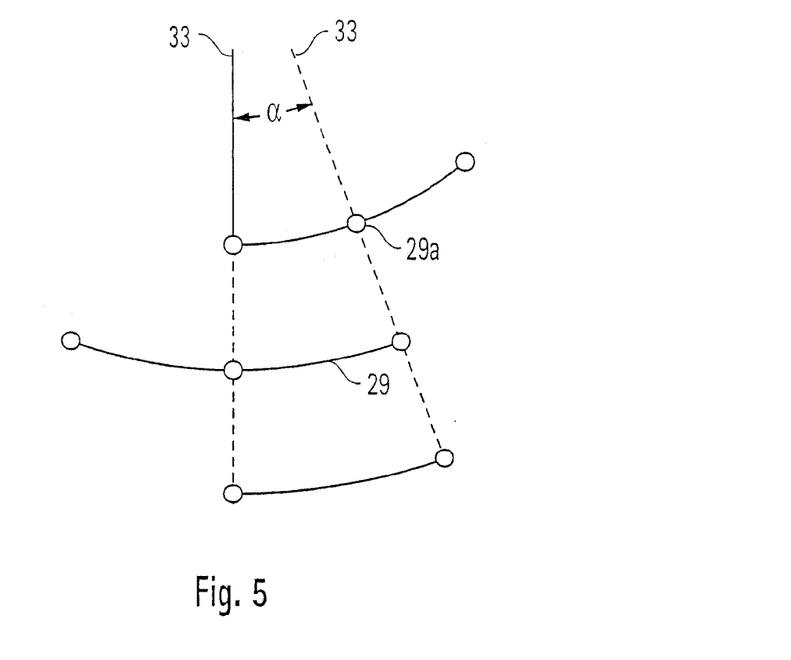
FIG. 5 is a view showing the path of displacement of the actuator for a first embodiment of a movement converter according to the present invention.

If the gearshift lever 2 is pivoted about the first pivot axis 11, it carries the transmission element 19 at the strap 21 and thus pivots it about the axis of the pivot pin 27. An actuator arranged in a mounting bracket 22 of the joint body 16 correspondingly describes an arc in a plane of displacement at right angles to the axis of the pivot pin 27. By contrast, pivoting of the gearshift lever 2 about the second pivot axis 12 brings about a longitudinal displacement of the joint body 16 in the opening 20 of the transmission element 19 and hence a displacement of the actuator radially to the axis of the pivot pin 27. Since the pivot pin 27 is arranged at the transmission element 19, the actuator cannot now leave the plane of displacement. The shifting paths 15 indicated by broken lines in FIG. 1 are thus converted into the displacement paths 29 of the actuator which are shown in FIG. 5. The rings 29a indicate the position of the actuator in the locked positions 15a of the gearshift lever 2. If the locking contour 23 limits the pivoting movements of the bearing bolt 3 to a deflection of the joint head 7 in the direction of the longitudinal extension of the opening 20 in the transmission element 19 for receiving the joint body 16, as is shown in FIGS. 1 and 5, the cross section of the bearing opening 17 can be adapted to the geometry of the circumference of the joint head 7 without stretching, because no movement components directed at right angles to the longitudinal direction 18 occur.

Figure 6:
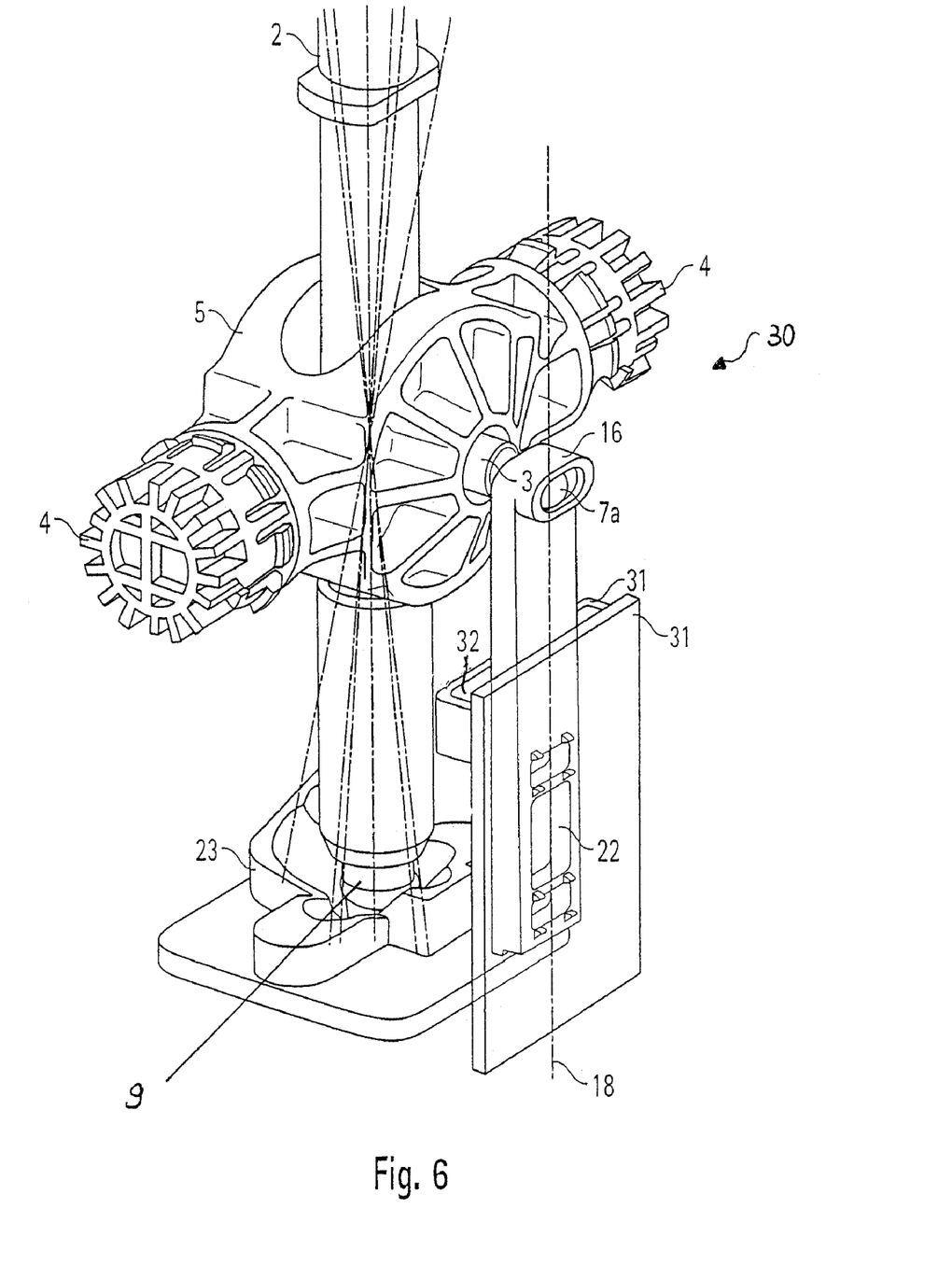
FIG. 6 is a view showing the mechanical part of an electromechanical gearshift lever assembly unit with a second embodiment of a movement converter according to the present invention.

FIG. 6 shows a gearshift lever assembly unit 30 with a device for converting a biaxial pivoting movement of a gearshift lever 2 according to a second embodiment of the present invention. The joint body 16 has at one end a bearing opening 17 with different dimensions at right angles to and along its longitudinal extension 18. The joint head 7a has a cylindrical shape in the example being shown and is accommodated in the bearing opening 17 with the axis of symmetry of the joint head 7a at right angles to the longitudinal direction 18. The cross section of the bearing opening 17 corresponds to the geometry of the circumference of the joint head 7a in its view in the direction of the first pivot axis 11.

The second end of the joint body 16 is guided in the eye of a strap 31 such that the movement of the joint body 16 is limited to the plane of displacement determined by the longitudinal wall 32 of the strap. The bearing bolt 3 is rigidly connected with the gearshift lever.

Pivoting of the gearshift lever 2 about the first pivot axis 11 brings about a pivoting of the joint body 16 about this pivot axis 11 in the plane of displacement defined by the longitudinal wall 32 of the strap. Pivoting of the gearshift lever 2 about the second pivot axis 12 brings about a pivoting of the bearing bolt about this axis 12. The joint head 7a thus moves on an arc of a circle with the pivot axis 12 as its center. The movement component directed at right angles to the plane of displacement leads to a displacement of the joint head 7a in the bearing opening 17 at right angles to the plane of displacement and does not change as a result the position of the joint body 16. The movement component directed in parallel to the plane of displacement brings about a vertical displacement of the joint body in this plane.

Figure 7:
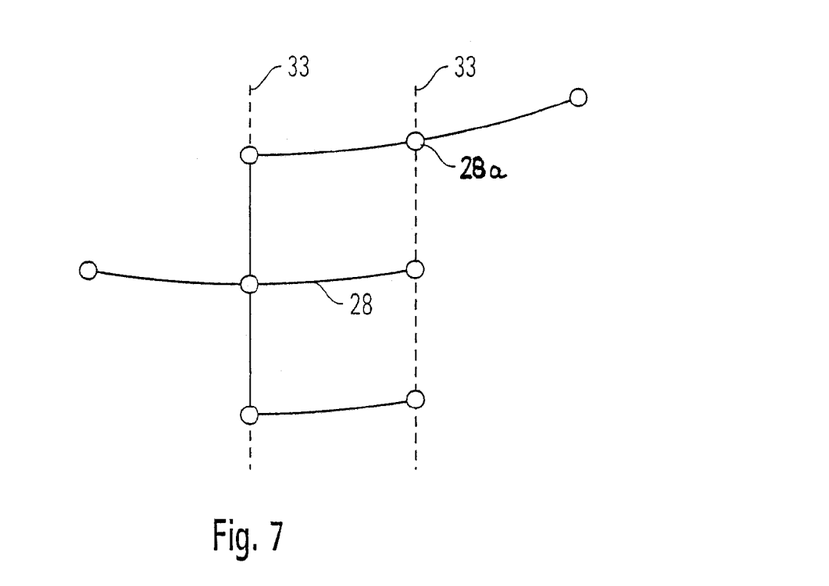
FIG. 7 is a view showing the path of displacement of the actuator for a second embodiment of a movement converter according to the present invention.

The shifting paths 15 indicated by broken lines in FIG. 1 are thus converted into the displacement paths 28 of the actuator which are shown in FIG. 7. The rings 28a indicate the position of the actuator in the locked positions 15a of the gearshift lever 2. Contrary to the first embodiment of the present invention, the broken lines 33 connecting the positions of the actuator are directed in parallel and not inclined in relation to one another at equal pivoting angle of the gearshift lever 2 about the first pivot axis 11 but different pivoting angle about the second pivot axis 12.

While specific embodiments of the invention have been shown and described in detail to illustrate the application of the principles of the invention, it will be understood that the invention may be embodied otherwise without departing from such principles.

List of Reference Numbers:

| | |
|---|---|
| 1 | Gearshift lever mechanism |
| 2 | Gearshift lever |
| 3 | Bearing bolt |
| 4 | Bolt |
| 5 | Bracket |
| 6 | Securing pin |
| 7, 7a | Joint head |
| 8 | Tapered neck |
| 9 | Locking element |
| 10 | Gearshift lever axis |
| 11 | First pivot axis |
| 12 | Second pivot axis |
| 13, 14 | Arrow |
| 15 | Course of path |
| 15a | Locked positions |
| 16 | Joint body |
| 17 | Bearing opening |
| 18 | Longitudinal direction |
| 19 | Transmission element |
| 20 | Opening |
| 21, 31 | Strap |
| 22 | Mounting opening |
| 23 | Locking contour |
| 24 | Gearshift lever housing |
| 25, 30 | Gearshift lever assembly unit |
| 26 | Defined positions |
| 27 | Pivot pin |
| 28, 29 | Paths of displacement of actuator |
| 28a, 29a | Position of actuator |
| 32 | Longitudinal wall of strap |

What is claimed is:

1. A device for converting a biaxial pivoting movement of a gearshift lever into a planar movement of a gearshift lever position transmitter, the device comprising:
a guide element for limiting the movement of the gearshift lever position transmitter to a movement in a noncurved plane,
a transmission element for transmitting a pivoting movement of the gearshift lever about a first pivot axis into a pivoting movement of the gearshift lever position transmitter in said noncurved plane; and
a hinge joint for converting a pivoting movement of the gearshift lever about a second pivot axis into a movement of the gearshift lever position transmitter in said noncurved plane, so that the positions of the gearshift lever can be detected in said noncurved plane, said first pivot axis of said gearshift lever comprising a bearing bolt with an end including a joint head for being accommodated in the gearshift lever position transmitter, wherein to accommodate the joint head, the gearshift lever position transmitter has an elongated opening with a cross section geometry that reflects essentially the geometry of the joint head at right angles to the axis of the bearing bolt at equal or larger dimensions.

2. A device in accordance with claim 1, wherein the hinge joint is arranged to the side of the gearshift lever.

3. A device in accordance with claim 1, wherein said guide element is arranged with a defined reference to the gearshift lever housing.

4. A device for converting a biaxial pivoting movement of a gearshift lever into a planar movement of a gearshift lever position transmitter, the device comprising:
a guide element for limiting the movement of the gearshift lever position transmitter to a movement in a noncurved plane,
a transmission element for transmitting a pivoting movement of the gearshift lever about a first pivot axis into a pivoting movement of the gearshift lever position transmitter in said noncurved plane; and
a hinge joint for converting a pivoting movement of the gearshift lever about a second pivot axis into a movement of the gearshift lever position transmitter in said noncurved plane, so that the positions of the gearshift lever can be detected in said noncurved plane, said first pivot axis of said gearshift lever comprising a bearing bolt with an end including a joint head for being accommodated in the gearshift lever position transmitter, said joint head having a cylindrical shape.

5. A device for converting a biaxial pivoting movement of a gearshift lever into a planar movement of a gearshift lever position transmitter, the device comprising:
a guide element for limiting the movement of the gearshift lever position transmitter to a movement in a noncurved plane,
a transmission element for transmitting a pivoting movement of the gearshift lever about a first pivot axis into a pivoting movement of the gearshift lever position transmitter in said noncurved plane; and
a hinge joint for converting a pivoting movement of the gearshift lever about a second pivot axis into a movement of the gearshift lever position transmitter in said noncurved plane, so that the positions of the gearshift lever can be detected in said noncurved plane, said first pivot axis of said gearshift lever comprising a bearing bolt with an end including a joint head for being accommodated in the gearshift lever position transmitter, said joint head having a cylindrical shape, wherein the axis of symmetry of the cylindrical joint head is arranged essentially at right angles to the axis of the bearing bolt.

6. A device for converting a biaxial pivoting movement of a gearshift lever into a planar movement of a gearshift lever position transmitter, the device comprising:
a guide element for limiting the movement of the gearshift lever position transmitter to a movement in a noncurved plane,
a transmission element for transmitting a pivoting movement of the gearshift lever about a first pivot axis into a pivoting movement of the gearshift lever position transmitter in said noncurved plane; and
a hinge joint for converting a pivoting movement of the gearshift lever about a second pivot axis into a movement of the gearshift lever position transmitter in said noncurved plane, so that the positions of the gearshift lever can be detected in said noncurved plane, said first pivot axis of said gearshift lever comprising a bearing bolt with an end including a joint head for being accommodated in the gearshift lever position transmitter, said joint head having a cylindrical shape, wherein the axis of symmetry of the cylindrical joint head is arranged essentially at right angles to the axis of the bearing bolt, said joint head forming said transmission element.

* * * * *